March 12, 1929.　　　J. S. REYNOLDS　　　1,704,762
HYDRAULIC BRAKING SYSTEM
Filed March 28, 1925　　　3 Sheets-Sheet 1
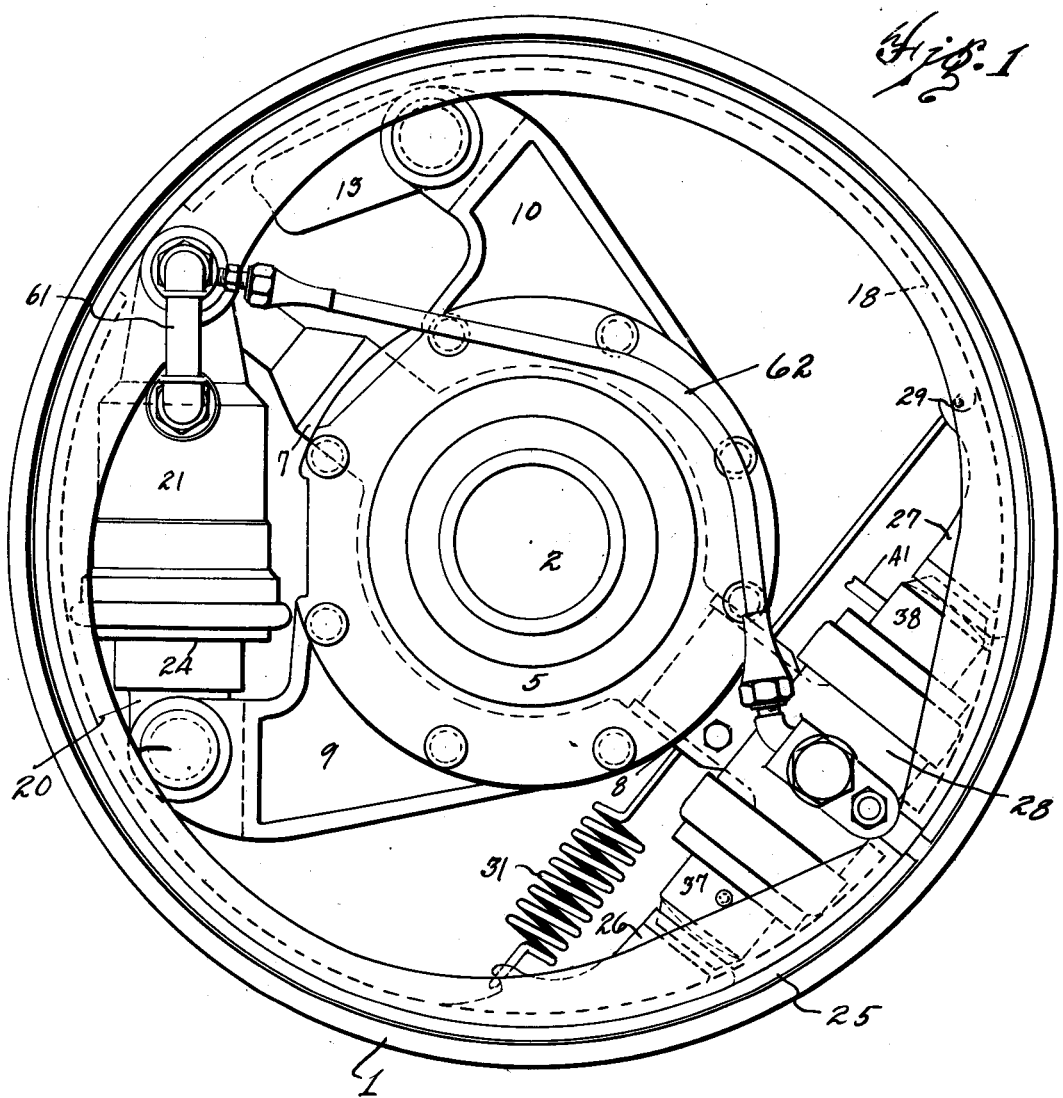
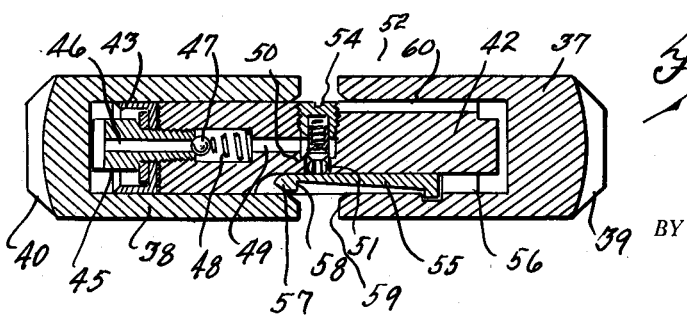
INVENTOR.
Joy S. Reynolds
BY
ATTORNEY.

March 12, 1929.   J. S. REYNOLDS   1,704,762
HYDRAULIC BRAKING SYSTEM
Filed March 28, 1925   3 Sheets-Sheet 2
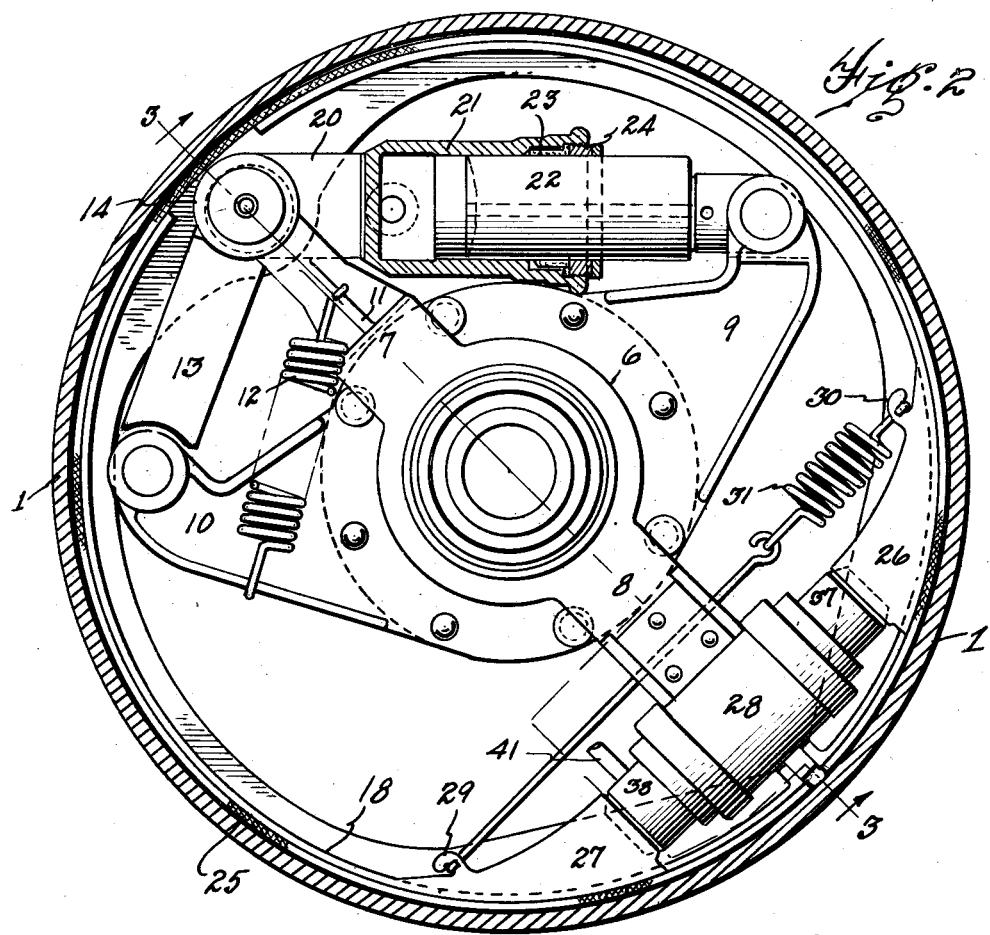
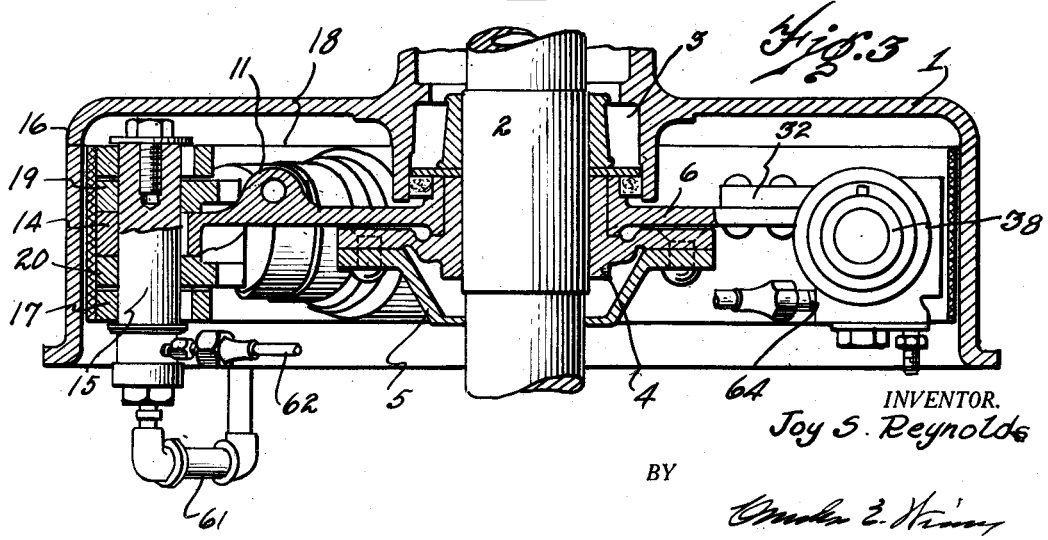
INVENTOR.
Joy S. Reynolds
BY
ATTORNEY.

March 12, 1929.  J. S. REYNOLDS  1,704,762
HYDRAULIC BRAKING SYSTEM
Filed March 28, 1925  3 Sheets-Sheet 3
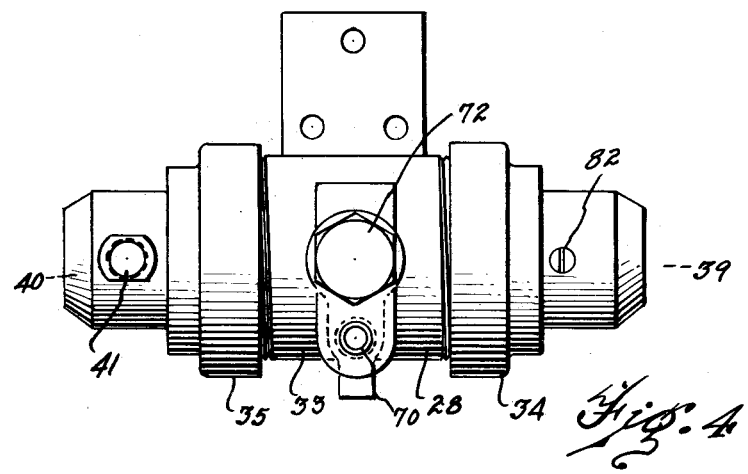
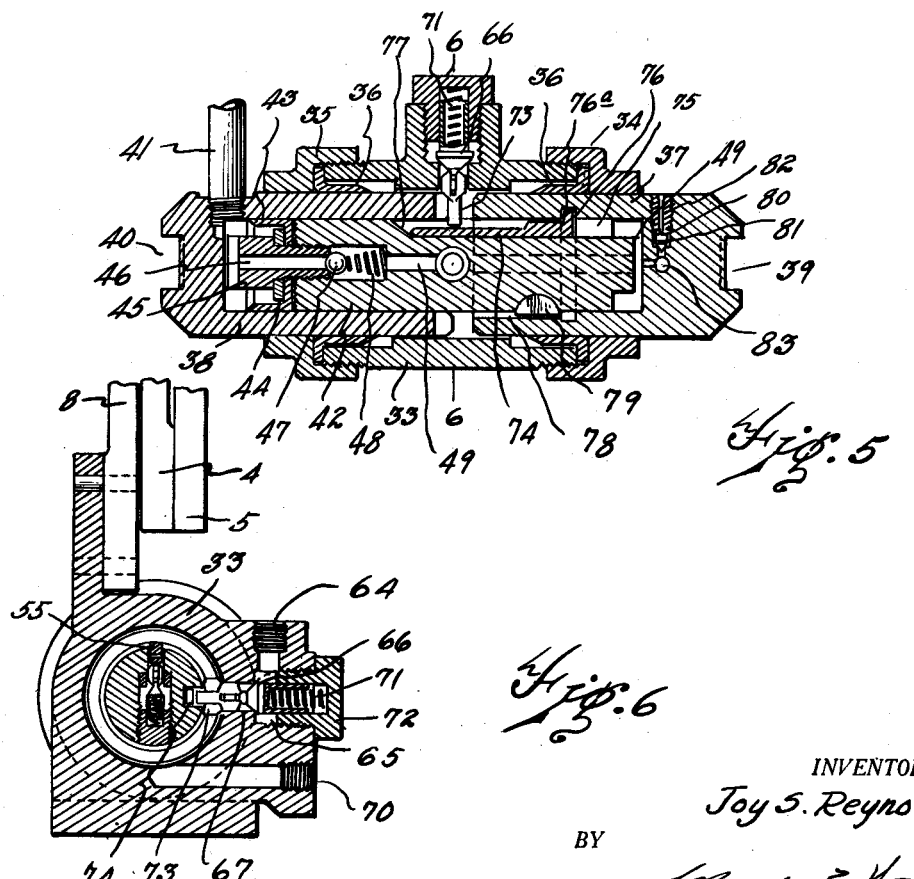
INVENTOR.
Joy S. Reynolds
BY
ATTORNEY.

Patented Mar. 12, 1929.

1,704,762

UNITED STATES PATENT OFFICE.

JOY S. REYNOLDS, OF DETROIT, MICHIGAN.

HYDRAULIC BRAKING SYSTEM.

Application filed March 28, 1925. Serial No. 18,979.

This invention relates to hydraulic braking systems for automotive vehicles, and the object is to provide a new and efficient mechanism for the application of power hydraulically to several brake bands with equal pressure.

A feature of the invention is in the mechanism employed to augment the pressure applied to set the brake and to transmit the pressure to other brakes. The fundamental principle involved in this system is disclosed in my pending application for Letters Patent of the United States for means for vehicle braking Serial No. 747,628, filed November 3, 1924.

This fundamental feature involves the provision of a brake band for a drum which is so mounted as to turn with the drum to a limited extent. The application of power to set the brake band causes it to engage the drum with a certain movement computable by the power applied and the surface area of the band in frictional contact with the drum. This functional resistance to movement of the band is utilized to apply additional power hydraulically to the brake operating element and may be utilized to transmit the power hydraulically to other brake elements as for instance is necessary in a four-wheel brake system.

The particular feature of this invention is involved in the construction of the brake operating element. This is of such character that upon application of power the brake band is set with certain pressure caused by movement of plungers or similar elements as hereinafter described. This movement of the plungers is utilized to open the space between the plungers to hydraulic pressure developed by movement of the brake band, the elements operating to prevent application of pressure to the space between the plungers in excess of the applied power.

A further object of the invention is to secure simplicity of construction and arrangement of parts not only in the brake operating element itself but also in the means for the secondary application of fluid under pressure to the brake operating element or to other elements as may be desired. These objects and the several novel features of the invention are hereinafter more fully described and claimed, and the preferred form of construction of a hydraulic brake embodying my invention is shown in the accompanying drawings in which—

Fig. 1 is an elevation showing a portion of a brake drum and my improved braking apparatus therein.

Fig. 2 is a similar view partly in section taken from the opposite side.

Fig. 3 is a section taken on line 3—3 of Fig. 2.

Fig. 4 is a plan view of the expanding element.

Fig. 5 is a longitudinal section thereof.

Fig. 6 is a section taken on line 6—6 of Fig. 5.

Fig. 7 is a section taken on a plane at a right angle to that of Fig. 6.

The drawings do not show the wheel proper on which the drum is mounted but in Fig. 3 it will be noted that the brake drum 1 and the wheel (not here shown) are rotatable on the axle 2, there being bearings 3 provided supporting the axle in the wheel. Also, on the axle is the member 4 to which the rear axle housing 5 is secured. It will be noted that there is a member 6 that is rotatably mounted upon the element 4 to which the axle housing is secured. This element 6 has two arms 7 and 8. The member 4 is also provided with two arms 9 and 10 which, being attached to the axle housing, are stationary relative to the wheel and to the element 6 which may turn thereon. The arm 7 is provided with a rib 11 to which is attached one end of a coiled spring 12, the opposite end being attached to the flange of the arm 10. This spring tends to hold the turnable element 6 in a certain position relative to the fixed member 4 and arms 9 and 10 thereon. As will be seen in Fig. 2, to the end of the arm 10 is secured the bar 13 with a rounded end to be engaged by the rounded end 14 of the arm 7 under action of the spring 12. This end of the arm 14 receives a central shaft like member 15 which is free to turn therein, and this member 15 extends through bosses 16 and 17 of the brake band 18. As shown in Fig. 3, between these members 16 and 17 and the member 14 of the arm 7 are the two bars 19 and 20 preferably formed integral with the base of the cylinder 21. These bars or arms 19 and 20 are likewise pivoted on the member 15. To the end of the bar 9 is pivotally mounted a piston 22 for the cylinder 21 and the cylinder and piston are packed by means of a cylindrical member 23 of leather or other similar material secured in the end cylinder by means of the plug 24. One end of the packing member 23 is held between the plug 24 and a shoulder formed in the end of the cylinder 21. Pressure of fluid in the cylinder which may pass between the cylinder and piston acts to hold the packing member 23 in proper engagement with the piston preventing leakage.

The expanding brake band 18 has the usual friction surface 25 to engage the inner wall of the drum 1 as will be readily understood from the drawing and this brake band is split preferably a point diametrically opposite the member 15. Near each end of the band is provided a rib 26 and 27 respectively between which is positioned the expanding element 28. These ribs are provided with hook members 29 and 30 and a spring member 31 is connected therebetween tending to free the band from frictional engagement with the drum. The member 28 is carried by the arm 8, it being provided with a bracket 32 riveted to the arm as will be understood from Fig. 3.

The expanding element is shown in detail in Figs. 4, 5, 6 and 7 and consists of a body 33 threaded at each end to receive the packing nuts 34 and 35 which engage the flanged end of a cylindrical packing member 36 which may be of leather or other suitable material. By pressure of oil within the body these packing members 36 are held in engagement with the respective plungers 37 and 38 which are movable through the packing nuts and packing members. Each plunger 37 and 38 is grooved at the outer end as indicated at 39 and 40 and these grooves, as will be understood from Figs. 1 and 2, engage the end of the respective ribs 26 and 27 near the two ends of the brake band 18. It will be readily observed that upon applying liquid under pressure between the plungers the same will be spread apart thus forcing the brake band into engagement with the brake drum. With the usual automotive vehicle a foot pedal for operation of the brake is provided and, while not here shown, it is to be understood that by movement of a brake pedal or other pressure producing device, fluid under pressure is supplied to the tube 41. This tube is attached to the end of the plunger 40 which is hollow and the pressure is applied against the end of the interior piston 42 which is movable longitudinally of both the members 39 and 40. The end of the piston 42 within the plunger 40 is provided with a packing 43 similar in all general respects to the packing 36 of the plunger 40, it being held in position by a washer 44 and a hollow threaded stem 45 which extends into an aperture in the end of the member 40. The member 40 has a longitudinal channel or aperture 46 normally closed by a ball 47 through operation of the spring 48. Upon application pressure to the end of the piston 42 within the plunger 38, the said piston 42 is moved longitudinally of the two members 37 and 38. Oil or liquid under pressure applied to the line 41 passes through the channel 46 unseating the ball 47 and passes into the channel 49 and, as shown more clearly in Fig. 7, passes into the valve chamber 50 and thence through the aperture 51 to between the adjacent ends of the plunger. This, for a short interval of time supplies liquid under pressure to between the plungers 37 and 38, takes up the slack in the brake band (the ends of which are engage respectively by these two plungers) and tends to initially set the brake. Movement of the plunger members apart by this initial pressure permits the lever end 57 to move outward into the space between the adjacent ends of the two plungers and closes the valve 52. This valve 52 is what I have termed the filler valve and initial application of pressure through the line 41 tends to maintain the expanding element full of liquid. After the valve 52 is closed, further pressure applied through the line 41 is effective only on the end of the piston 42 within the plunger 38. The valve 52 tends to be closed by the spring 53 seating in the hollow plug 54 at one end of the valve recess and is held normally unseated by the pivoted lever 55 lying in the groove 56 in the piston 42. This lever has a hooked end lying in a groove 76ª in the plunger 37 and the notched end 57 is held in the position shown in Fig. 7 by the wall of the plunger 38. As the plunger 37 and 38 are spread apart the said notched end 57 is moved outwardly into the space between the adjacent ends of the plungers by action of the valve spring and the valve closes the conduit 49 as previously stated. Therefore, upon application of pressure to the line 41 the piston 42 is moved and the members 37 and 38 are spread and the brake band is set by pressure determined by the power applied.

As shown in Fig. 7 there is a by-pass consisting of a groove 60 in the surface of the member 42 that is within the member 37. This opens to the space between the adjacent ends of the members 37 and 38 and the pressure that is applied to the fluid between the ends thereof through application of pressure in the line 41 is applied to the fluid in the space between the end of the member 42 and bottom of the recess in the member 37. There is thus, after the initial movement of the member 42, pressure applied equally between each end of the member 42 and the respective members 37 and 38 which tends to set the brake band with certain pressure. The initial setting of the brake band causes the same to tend to turn with the drum when the wheel is rotating and therefore the member 6 and the arms 7 and 8 tend to turn about the axis of the wheel and this moves the cylinder 21 over the piston 22 which is stationarily held by the member 9. The cylinder 21 has a conduit 61 opening thereinto, which conduit leads into the end of the member 15 as shown in Fig. 3 and a conduit 62 leads therefrom to the port 64 of the valve chamber 65. In this chamber is the spring seated valve 66 closing the aperture 67 in the wall of the member 33 which opens to the space between the members 37 and 38 as will be understood from Fig. 5 and thus pressure is developed in the cylinder 21 by the initial movement of the brake band with the drum. The pressure applied through the line 62 to between the ends of the members 37 and 38 is equal to the frictional resistance to relative movement between the set brake band and the drum. The pressure applied through the line 62 to between the plungers 37 and 38, however, can be no greater than the pressure applied through the line 41 for the reason that the pressure applied to between the ends of the members 37 and 38 is applied through the bypass 60 to the space between the end of the piston 42 and the bottom of the recess of the member 37. If this pressure is greater than that applied through the conduit 41 the piston member 42 would move backward in the member 38 against the pressure applied through the line 41. This would cause the beveled end 57 of the member 55 to occupy the position shown in Fig. 7 opening the valve 51 and seating the ball 47. The seating of the ball 47 prevents return of fluid to the supply line. The pressure applied to set the brake operates means to transmit fluid under pressure through line 62, but this transmitted pressure does not operate to set the brake with any greater force than is applied through the line 41. This is important in view of the various conditions found in the operation of an automotive vehicle. Some brakes "seize" readily and in the hydraulic system as herein disclosed the seizing of a brake band might operate to apply greater pressure to the spreading members than is determined to be applied by a foot brake. With the arrangement described cooperating with another valve mechanism hereinafter described, and irrespective of the condition of the brake band as to its seizing or as to its running freely, the pressure that will be applied by means of movement of the brake with the drum is determined solely by the initial power applied.

At the present time automotive vehicle manufacturers are generally adopting the four-wheel brake system, some of which are mechanical in their operation and some of which are hydraulically operated. The system herein disclosed is of the hydraulic type and a problem involved is to apply the brakes of the several wheels with uniform pressure so that no one wheel will be restrained from rotation to any greater degree than any other wheel and the forward wheel brakes cannot be set previous to setting the driving wheel brakes. This fundamental idea of applying a master brake and by it transmitting an equal pressure to several elements is believed to be here first disclosed and it is an object of this invention to secure a hydraulic braking system operating in the manner described and wherein the degree of pressure applied by the foot brake determines the pressure applied to all the elements. In this system herein disclosed the power applied to set the brake, shown for instance in Fig. 3, may through the setting of the brake transmit the same power to other elements without any additional power being applied to the element causing pressure in the tube 41.

The structure shown in the drawings is adapted to transmit power to additional elements of the same general character particularly one in which spreader elements similar to those herein shown are used to expand the brake band to contact the braked rum as will be readily understood. This is accomplished by means of a tube connecting with the outlet aperture 70 of the expander shown particularly in Fig. 6. This aperture extends into the casing 33 and opens to the chamber between the spreader elements 37 and 38 so that any pressure developed in this chamber is transmitted by a tube connected with this element 70 to the other braking elements. It will be noted that the pressure applied at the aperture 64 and the chamber 65 by the tube 62 is not transmitted to between the elements 37 and 38 until the valve 66 is opened and for a proper operation of the system this valve is not opened until after the brake band has been applied with the determined pressure. It is to be noted that this valve 66 is seated by means of a spring 71 in the hollow nut 72 closing the valve recess at one end and is provided with a stem 73 extending into the space between the members 37 and 38 as shown in Fig. 5. This stem 73 rides in contact with a lever 74 lying in a channel 75 in the central piston member 42. The lever 74 has a hook end 76 engaging in a recess or groove 76ᵃ formed in the interior wall of the member 37. This lever is capable of movement at the opposite end toward and away from the central longitudinal axis of the piston 42. This movement of the member 74 is occasioned by reason of the angular end portion 77 of the recess 75 up which the end of the member 74 rides on initial movement of the piston 42 to expand the brake. Depending upon the length of this member there is a certain slight movement of the member 42 before the member 74 lifts but as the member 42 begins to move the member 37, the valve 66 is raised from its seat by the outward movement of the lever. Pressure is immediately applied to between the members 37 and 38 by pressure developed in the cylinder 21 and this pressure is transmitted through the orifice 70 in Fig. 6 to additional elements as may be desired as for instance a forward wheel brake or by flexible conduit to a brake on a trailing vehicle but it is to be noted that the main or master brake to which power is first applied through the tube 41 is first set and by the setting of this master brake pressure is produced for transmission to other elements and to this same element and the pressure in the chamber supplied by the line 62 and in the line connected with the port 70 must be identical with that applied to the tube 41. In this transmission of pressure through the port 70 and to apparatus connected therewith the pressure applied does not exceed the initial pressure applied to the tube 41 in setting the master brake for the following reason: It is to be noted that, should pressure tend to build up in the chamber between the ends of the members 37 and 38 of the master brake this pressure by means of the by-pass 60 is applied to between the end of the member 42 and the bottom of the recess of the member 37 and would move the member 42 to the left. This would permit the lever 74 to ride down the cam to the position shown in Fig. 5 closing the valve 66. The lever 55 also opens the valve 52 which opens the line 49 to this fluid pressure seating the ball valve 47 as heretofore stated. Movement of the piston member 42 to the left or toward the inlet end of the member 38 is only counteracted by the amount of pressure applied to the fluid in the tube 41 and thus if an excess pressure occurs between the two members this pressure is relieved by backward movement of the piston 42 which is not a movement tending to spread the members 37 and 38 and set the brake. Therefore, the only pressure that can be utilized to separate the members 37 and 38 and set the master brake element cannot be in excess of the pressure applied to the tube 41 and the pressure transmitted to additional brake elements, which pressure has its source in the chamber between the two members 37 and 38 of the master brake, can only rise to equality with the pressure applied to the fluid in the tube 41.

From the foregoing description it will become evident that the system is comparatively simple and is unique in the means employed for the setting of the master brake in view of the arrangement of parts to initially expand and thus set the master brake by fluid pressure applied to the tube 41 and this first setting of the brake is caused by the end of the piston 42 engaging the bottom of the recess of the end of the plunger 37. When the member 42 meets with resistance to movement the ball valve 47 will open and this will transmit fluid under pressure from the line 41 through the line 49 and to the space between the members 37 and 38 insuring the filling of said space and thus applies pressure to the additional area tending to force these plungers 37 and 38 apart. As before stated movement of the plunger 37 allows the end 57 of the lever 55 to move into the space between the plungers 37 and 38 which permits the closing of the valve 52 by its spring. Pressure is then introduced between the plunger 37 and 38 through the tube 62 leading to the port 64 and introduced between the two members by the raising of the valve 66 from its seat which is caused by movement of the piston 42 acting on the lever 74. The position of the valve 66 depends upon the position of the member 42 in the plungers 37 and 38. The pressure that would be applied between the two plungers 37 and 38 and to additional braking elements through a line connected with the port 70 will not exceed that applied to the line 41 and the instant that the pressure developed by the movement of the master brake band with the brake drum exceeds that in the line 41, the member 42 in retreated from the position just stated to its original position closing the valve 66 and opening the valve 52 thus the transmitted pressure and the initial pressure are in balance.

It is desirable that the piston 42 and plunger 37 be not revolved relative one to the other and for this reason I have provided the plunger 37 with a groove 78 and a key 79 is provided in the piston 42 which rides in this groove. This holds the part from relative rotation.

I have provided a valve 80 in the end of the plunger 37 which is screw threaded in an aperture provided therefor opening to the interior of the plunger 37 at the end. This valve has a tapered portion 81 for engaging the seat and has a slot 82 in the side thereof. On turning this valve outwardly to raise it from the seat, the conduit 83 is opened to atmosphere. The purpose of this valve is to free the system of air upon filling with oil or other fluid by means of the pressure of which the system is operated. By the structural arrangement of the parts described the various objects of this invention are secured particularly transmission of power hydraulically through the seating of the master brake. Systems heretofore in use utilize the power supplied by the main supply conduit directly to the braking elements. With my invention the power is initially applied to setting the master brake and frictional resistance of the brake is utilized to transmit the power to other elements and this invention departs from previous inventions in this respect and distinguishes from my former pending applications in that means is utilized to prevent pressure in excess of that applied to the supply tube to be applied to any braking element.

I have herein described an expanding mechanism operating an internal brake band. This character of construction has been here shown to illustrate the principle of operation of the invention but it is not material broadly to this invention whether an internal or an external type of brake be utilized.

Having thus fully described my invention, what I claim and desire to secure by Letters Patent of the United States is—

1. In a braking system for automotive vehicles provided with a rotatable brake drum, a master brake adapted to be set by application of hydraulic pressure, means whereby the setting of the brake develops corresponding hydraulic pressure, means for transmitting the developed pressure, and means for maintaining the transmitted pressure and the initial pressure applied in setting the brake in balance.

2. In a braking system for automotive vehicles including a rotatable braking drum, a master brake adapted to turn with the drum upon application of pressure to set the brake, an element actuated by hydraulic pressure to set the brake, means for developing hydraulic pressure by the turning of the brake, means for transmitting the developed pressure to the hydraulically actuated element, and means whereby the pressure applied by the transmitted pressure is maintained in balance with the pressure applied in initially setting the brake.

3. In a braking system for automotive vehicles including a rotatable brake drum, a master brake adapted to turn to a limited extent with the drum upon application of pressure to set the brake, an element adapted to be expanded by hydraulic pressure to set the brake, means whereby the turning of the brake with the drum develops hydraulic pressure, a conduit for transmitting the said developed pressure to the expanding element, said element being so arranged that the pressure transmitted thereto is not in excess of the pressure initially applied to set the brake, and a conduit for fluid open to fluid under pressure produced in the element by the transmitted pressure.

4. In a brake mechanism for the wheel of an automotive vehicle provided with a brake drum, a brake band oscillatively mounted and adapted to turn with the drum upon frictional engagement of the band therewith, a spring tending to hold the brake band free from engagement with the drum, manually operable means for causing engagement of the band with the drum, a cylinder and a piston, one of which is stationarily mounted and the other of which is movable with the brake band, an element associated with the brake hand and adapted upon application of pressure to cause frictional engagement of the band on the drum, a conduit leading from the said piston and cylinder to the said element, the said piston, conduit and element being full of fluid whereby upon relative movement of the piston and the cylinder caused by setting the brake hydraulic pressure is transmitted to the element for setting the brake band, said element having a chamber for fluid under pressure, and a conduit leading from the said chamber for transmission of pressure developed therein.

5. In a braking mechanism for a wheel having a brake drum, an expansible brake band within the drum, an arm to which the band is secured mounted to turn on the axis of the drum, an expanding element comprising two cylinders having adjacent open ends and being movable to engage the opposite free ends of the band, a piston within the two cylinders, a conduit leading into one of the cylinders through which fluid under pressure may be transmitted to move the piston, the application of pressure moving the piston relative to the cylinder in which the pressure is first applied and moving the other cylinder upon engagement of the piston therewith whereby the two cylinders are caused to separate to an extent determined by the pressure applied, means whereby upon frictional engagement of the band with the drum, fluid under pressure may be delivered between the cylinder ends.

6. In a hydraulic braking system for a wheel having a brake drum, a brake element adapted for frictional engagement with the drum, said element being adapted to turn with the drum upon frictional engagement therewith, an expanding element through operation of which the brake band may be caused to frictionally engage the drum, said expanding element comprising a body, a pair of cylinders having adjacent open ends and movable relative to the body, a piston movable longitudinally of the two cylinders, means whereby the turning of the band with the drum develops hydraulic pressure, a conduit leading from the said means to the said body between the cylinder ends, means for applying fluid under pressure to one of the cylinders at one end of the piston to move the piston relative to the cylinders to initially apply the brake, a valve in the conduit for transmitting the developed pressure to between the cylinders, means whereby the said valve is automatically opened by movement of the piston in the cylinders to permit fluid under pressure to be delivered between the cylinders, there being a passageway for fluid from between the cylinder ends to between the end of the piston and the cylinder to counteract the pressure applied to move the piston whereby an excess of pressure transmitted to between the cylinders moves the said piston and permits the closing of the valve.

7. In a hydraulic brake, a brake drum, a band for frictional engagement with the drum, an element adapted to be expanded by hydraulic pressure to set the brake, means for applying pressure hydraulically to said element, means whereby the setting of the brake produces hydraulic pressure independently of the hydraulic pressure applied, means for transmitting the developed hydraulic pressure to other hydraulically actuated instrumentalities, and means for maintaining the transmitted pressure in balance with the initial pressure applied.

8. In a hydraulic brake, a brake drum, a band for frictional engagement with the drum, means for initially causing engagement of the band with the drum, means whereby initial setting of the brake produces a hydraulic pressure, a chamber to which the fluid under pressure is applied, means for preventing an accumulation of pressure in the chamber in excess to a material degree of the pressure initially applied to set the brake, and a conduit connected with the chamber for the transmission of pressure hydraulically.

9. In a braking system for automotive vehicles having a rotatable brake drum, a brake device operable by applied pressure to engage the drum and to turn therewith, means associated with the brake whereby the turning thereof develops hydraulic pressure, and means whereby the developed hydraulic pressure is not in excess of the pressure applied to cause engagement of the brake with the drum.

10. In a braking system for automotive vehicles including a rotatable brake drum, a brake device, means for applying pressure thereto to cause engagement of the brake with the drum, the said brake being adapted to turn with the drum upon application of pressure, means for transmitting liquid under pressure by the turning of the brake, and means for maintaining the pressure on the liquid and the pressure applied in balance.

11. In a braking system for automobiles having a rotatable brake drum, a brake element adapted to be set by application of hydraulic pressure, means whereby the setting of the brake develops a corresponding hydraulic pressure, and means for preventing the development of hydraulic pressure in excess of that applied to set the brake.

In testimony whereof, I sign this specification.

JOY S. REYNOLDS.